(12) United States Patent
Tenorio

(10) Patent No.: US 8,086,643 B1
(45) Date of Patent: *Dec. 27, 2011

(54) TRANSLATION BETWEEN PRODUCT CLASSIFICATION SCHEMAS

(75) Inventor: Manoel Tenorio, Mountain View, CA (US)

(73) Assignee: JDA Software Group, Inc., Scottsdale, AZ (US)

( * ) Notice: Subject to any disclaimer, the term of this patent is extended or adjusted under 35 U.S.C. 154(b) by 974 days.

This patent is subject to a terminal disclaimer.

(21) Appl. No.: 09/895,654

(22) Filed: Jun. 28, 2001

(51) Int. Cl.
G06F 17/30 (2006.01)
G06F 15/18 (2006.01)

(52) U.S. Cl. .......................................... 707/802; 706/20

(58) Field of Classification Search .................. 707/2, 3, 707/4, 10, 100, 101; 705/26; 715/513, 514, 715/805, 835
See application file for complete search history.

(56) References Cited

U.S. PATENT DOCUMENTS

| | | | |
|---|---|---|---|
| 3,961,164 A | 6/1976 | Reed et al. | 235/61.12 |
| 5,347,632 A | 9/1994 | Filepp et al. | 395/200 |
| 5,564,043 A | 10/1996 | Siefert | 395/600 |
| 5,642,419 A | 6/1997 | Rosen | 380/23 |
| 5,694,546 A | 12/1997 | Reisman | 395/200.9 |
| 5,721,832 A | 2/1998 | Westrope et al. | 395/227 |
| 5,727,129 A | 3/1998 | Barrett et al. | 395/12 |
| 5,790,677 A | 8/1998 | Fox et al. | 380/24 |
| 5,870,473 A | 2/1999 | Boesch et al. | 580/31 |
| 5,918,229 A | 6/1999 | Davis et al. | 707/10 |
| 5,926,797 A | 7/1999 | Goodwin, III | 705/20 |
| 5,935,207 A | 8/1999 | Logue et al. | 709/219 |
| 5,963,134 A | 10/1999 | Bowers et al. | 340/572.1 |
| 5,970,471 A | 10/1999 | Hill | 705/26 |
| 5,970,490 A * | 10/1999 | Morgenstern | 707/10 |
| 5,987,233 A | 11/1999 | Humphrey | 395/200.47 |
| 6,006,218 A | 12/1999 | Breese et al. | 707/3 |
| 6,038,668 A | 3/2000 | Chipman et al. | 713/201 |
| 6,049,673 A | 4/2000 | McComb et al. | 395/712 |
| 6,078,891 A | 6/2000 | Riordan et al. | 705/10 |
| 6,081,840 A | 6/2000 | Zhao | 709/224 |
| 6,094,680 A | 7/2000 | Hokanson | 709/223 |
| 6,101,515 A | 8/2000 | Wical et al. | 707/531 |
| 6,105,134 A | 8/2000 | Pinder et al. | 713/170 |
| 6,128,600 A | 10/2000 | Imamura et al. | 705/27 |
| 6,128,624 A | 10/2000 | Papierniak et al. | 707/104 |
| 6,144,996 A | 11/2000 | Starnes et al. | 709/217 |

(Continued)

OTHER PUBLICATIONS

The specification of the provisional U.S. Appl. No. 60/278,033 related to the Reisman reference (Patent 7406436).*

(Continued)

*Primary Examiner* — Tarek Chbouki

(74) *Attorney, Agent, or Firm* — Booth Udall, PLC; Steven J. Laureanti

(57) ABSTRACT

A schema translation tool (36) includes a mapping module (37) that receives information regarding a source schema (70) and a target schema (80). The source and target schemas (70, 80) each include a taxonomy that includes a hierarchy of classes (72, 82) into which products may be categorized. At least the source schema (70) further includes a product ontology, including one or more product attributes, that is associated with one or more of the classes (72). The mapping module (37) associates one or more source classes (72) of the source schema (70) with one or more target classes (82) of the target schema (80). The schema translation tool (36) further includes an ontology generation module (38) that generates a product ontology for each of the target classes (82) based on the product ontologies of the associated source classes (72).

21 Claims, 5 Drawing Sheets

U.S. PATENT DOCUMENTS

| | | | | |
|---|---|---|---|---|
| 6,154,738 | A | 11/2000 | Call | 707/4 |
| 6,189,043 | B1 | 2/2001 | Buyukkoc et al. | 709/241 |
| 6,192,131 | B1 | 2/2001 | Geer, Jr. et al. | 380/283 |
| 6,199,082 | B1 | 3/2001 | Ferrel et al. | 707/522 |
| 6,212,512 | B1 | 4/2001 | Barney et al. | 707/1 |
| 6,236,975 | B1 | 5/2001 | Boe et al. | 705/7 |
| 6,236,978 | B1 | 5/2001 | Tuzhilin | 705/26 |
| 6,271,846 | B1 | 8/2001 | Martinez et al. | 345/357 |
| 6,285,366 | B1 | 9/2001 | Ng et al. | 345/356 |
| 6,286,002 | B1 | 9/2001 | Axaopoulos et al. | 707/10 |
| 6,289,382 | B1 | 9/2001 | Bowman-Amuah | 709/226 |
| 6,324,522 | B2 | 11/2001 | Peterson et al. | 705/28 |
| 6,334,131 | B2 | 12/2001 | Chakrabarti et al. | 707/10 |
| 6,336,910 | B1 | 1/2002 | Ohta et al. | 604/6.13 |
| 6,341,280 | B1 | 1/2002 | Glass et al. | 707/3 |
| 6,343,287 | B1 | 1/2002 | Kumar et al. | 707/4 |
| 6,356,899 | B1 | 3/2002 | Chakrabarti et al. | 707/5 |
| 6,366,910 | B1 | 4/2002 | Rajaraman et al. | 707/5 |
| 6,370,527 | B1 | 4/2002 | Singhal | 707/6 |
| 6,415,320 | B1 | 7/2002 | Hess et al. | 709/219 |
| 6,418,448 | B1* | 7/2002 | Sarkar | 1/1 |
| 6,460,038 | B1 | 10/2002 | Khan et al. | 707/10 |
| 6,466,240 | B1 | 10/2002 | Maslov | 345/853 |
| 6,466,918 | B1 | 10/2002 | Spiegel et al. | 705/27 |
| 6,476,832 | B1 | 11/2002 | Park | 345/789 |
| 6,489,968 | B1 | 12/2002 | Ortega et al. | 345/713 |
| 6,490,567 | B1 | 12/2002 | Gregory | 705/39 |
| 6,490,619 | B1 | 12/2002 | Byrne et al. | 709/223 |
| 6,516,350 | B1 | 2/2003 | Lumelsky et al. | 709/226 |
| 6,532,481 | B1 | 3/2003 | Fassett, Jr. | 707/203 |
| 6,553,364 | B1 | 4/2003 | Wu | 707/1 |
| 6,581,072 | B1 | 6/2003 | Mathur et al. | 707/104.1 |
| 6,591,252 | B1 | 7/2003 | Young | 705/67 |
| 6,708,161 | B2* | 3/2004 | Tenorio et al. | 707/2 |
| 6,745,177 | B2 | 6/2004 | Kepler et al. | 707/3 |
| 6,775,655 | B1 | 8/2004 | Peinado et al. | 705/59 |
| 6,778,991 | B2 | 8/2004 | Tenorio | 707/10 |
| 6,823,495 | B1* | 11/2004 | Vedula et al. | 715/805 |
| 6,874,141 | B1* | 3/2005 | Swamy et al. | 717/144 |
| 6,907,401 | B1* | 6/2005 | Vittal et al. | 705/26 |
| 7,010,539 | B1* | 3/2006 | Haas et al. | 707/101 |
| 7,275,079 | B2* | 9/2007 | Brodsky et al. | 709/203 |
| 7,373,349 | B2* | 5/2008 | O'Brien et al. | 707/100 |
| 7,406,436 | B1* | 7/2008 | Reisman | 705/10 |
| 7,512,558 | B1* | 3/2009 | Elad et al. | 705/37 |
| 7,660,874 | B1* | 2/2010 | Meltzer et al. | 709/218 |
| 2001/0016846 | A1 | 8/2001 | Chakrabarti et al. | 707/102 |
| 2001/0025262 | A1* | 9/2001 | Ahmed | 705/33 |
| 2001/0032162 | A1 | 10/2001 | Alsberg et al. | 705/37 |
| 2001/0034814 | A1 | 10/2001 | Rosenzweig | 711/118 |
| 2001/0044751 | A1 | 11/2001 | Pugliese, III et al. | 705/26 |
| 2001/0051927 | A1 | 12/2001 | London et al. | 705/51 |
| 2002/0026386 | A1 | 2/2002 | Walden | 705/27 |
| 2002/0032597 | A1 | 3/2002 | Chanos | 705/10 |
| 2002/0046147 | A1* | 4/2002 | Livesay et al. | 705/37 |
| 2002/0046187 | A1 | 4/2002 | Vargas et al. | 705/67 |
| 2002/0069157 | A1* | 6/2002 | Jordan | 705/37 |
| 2002/0077930 | A1* | 6/2002 | Trubey et al. | 705/26 |
| 2002/0082932 | A1* | 6/2002 | Chinnappan et al. | 705/26 |
| 2002/0083048 | A1* | 6/2002 | Tenorio et al. | 707/2 |
| 2002/0095355 | A1* | 7/2002 | Walker et al. | 705/26 |
| 2002/0099578 | A1* | 7/2002 | Eicher et al. | 705/7 |
| 2002/0099598 | A1* | 7/2002 | Eicher et al. | 705/11 |
| 2002/0111870 | A1* | 8/2002 | Chinnappan et al. | 705/26 |
| 2002/0111922 | A1* | 8/2002 | Young et al. | 705/80 |
| 2002/0120598 | A1* | 8/2002 | Shadmon et al. | 707/1 |
| 2002/0123955 | A1 | 9/2002 | Andreski et al. | 705/37 |
| 2002/0147704 | A1 | 10/2002 | Borchers | 707/3 |
| 2003/0018558 | A1* | 1/2003 | Heffner et al. | 705/37 |
| 2003/0033205 | A1 | 2/2003 | Nowers et al. | 705/26 |
| 2003/0055754 | A1* | 3/2003 | Sullivan | 705/31 |
| 2003/0093320 | A1* | 5/2003 | Sullivan | 705/19 |
| 2003/0149934 | A1* | 8/2003 | Worden | 715/513 |
| 2003/0167213 | A1 | 9/2003 | Jammes et al. | 705/27 |
| 2003/0195877 | A1 | 10/2003 | Ford et al. | 707/3 |
| 2003/0208507 | A1* | 11/2003 | Venkatram | 707/104.1 |
| 2004/0015829 | A1* | 1/2004 | Mullins et al. | 717/104 |
| 2004/0068576 | A1 | 4/2004 | Lindbo et al. | 709/232 |
| 2004/0128215 | A1* | 7/2004 | Florance et al. | 705/28 |
| 2004/0181493 | A1* | 9/2004 | Cross et al. | 705/75 |
| 2005/0021513 | A1* | 1/2005 | Vedula et al. | 707/3 |
| 2005/0033733 | A1* | 2/2005 | Shadmon et al. | 707/2 |
| 2005/0125781 | A1* | 6/2005 | Swamy et al. | 717/144 |
| 2005/0234902 | A1* | 10/2005 | Meredith et al. | 707/4 |
| 2006/0156253 | A1* | 7/2006 | Schreiber et al. | 715/835 |
| 2007/0081197 | A1* | 4/2007 | Omoigui | 358/403 |
| 2007/0088757 | A1* | 4/2007 | Mullins et al. | 707/200 |
| 2007/0112843 | A1* | 5/2007 | Swamy et al. | 707/102 |
| 2007/0226084 | A1* | 9/2007 | Cowles | 705/27 |
| 2008/0126265 | A1* | 5/2008 | Livesay et al. | 705/80 |
| 2008/0133381 | A1* | 6/2008 | O'Brien et al. | 705/27 |

OTHER PUBLICATIONS

Unknown, "website2Go Commerce User Guide, Shopping Cart Online Help," webshop2Go User Guide, http://web.archive.org/web/20000824163512/http://shopguied.website2go.com/, 2 pages, Internet Date May 27, 2003.

Unknown, "1998-1999 Database Seminar Series," Uoft Data Base Group, Database Seminar, http://www.cs.toronto.edu/DB/main/seminars98.html, 4 pages, Internet Date May 27, 2003.

Unknown, "Pars International parleys its sales automation strengths into E-Commerce leadership using Java and IBM SanFrancisco," IBM Press Release Sep. 1998, Pars.com—IBM Press Release Sep. 1998, http://www.pars.com/Ultra/IBMPressRelease.htm, 3 pages, Internet Date May 27, 2003.

Unknown, "ONYX Internet Ltd, The Challenge," eBusiness Innovation Awards 1999, http://www.ecommerce-awards.com/awards2000/winners/1998/finalists/onyx.html, 2 pages, Internet Date May 28, 2003.

Unknown, "eBay—Your Personal Trading Community," http://web.archive.org/web/19990117033159/pages.ebay.com/aw/index.html, About eBay, SafeHarbor, Bookmarks eBay Store, Go Global!, 9 pages (last updated Jan. 16, 1999), Internet date May 28, 2003.

Unknown, "Welcome to Amazon.com," Amazon.com—Earth's Biggest Selection, http://web.archive.org/web/19991013091817/http://amazon.com/, 6 pages, Internet date May 23, 2003.

Unknown, "Northern Light Search," http://web.archive.org/web/19980206192654/http://www.northernlight.com/, 18 pages, Internet date May 28, 2003.

Tracy Marks, "Lesson Two: My Computer and Explorer continued, G. Explorer: Orientation," Windows 95 Manual, Lesson 2, Using Explorer, Copying Files, http://www.windweaver.com/w95man2g.htm, 4 pages (copyright 1995, '96, '97), Internet date May 23, 2003.

Unknown, "Sample Full Hit Highlighting Form, Query i2 against document /news/1690.asp," Microsoft® Index Server, http://www.industryweek.com/iisamples/issamples/oop/qfullhit.htw?CiWebHitsFile=%2Fnews, 2 pages, Internet Date Dec. 3, 2001.

Unknown, "Sample Full Hit Highlighting Form, Query trademaatrix again document /columns/text/689.asp," Microsoft® Index Server, http://www.industryweek.com/iisamples/issamples/oop/qfullhit.htw?CiWebHitsFile=%2Fcolum, 2 pages, Internet Date Dec. 3, 2001.

PCT, Notification of Transmittal of the International Search Report or the Declaration, 3 pages, Dec. 28, 2001.

PCT, Notification of Transmittal of the International Search Report or the Declaration, 3 pages, Dec. 31, 2001.

U.S. Appl. No. 09/745,374, entitled "System and Method for Migrating Data in an Electronic Commerce System," filed Dec. 22, 2000, 46 total pages.

U.S. Appl. No. 09/745,980, entitled "System and Method for Selective Database Indexing," filed Dec. 22, 2000, 48 total pages.

U.S. Appl. No. 09/745,978, entitled "System and Method for Facilitating Electronic Commerce Transactions," filed Dec. 22, 2000, 44 total pages.

U.S. Appl. No. 09/746,120, entitled "System and Method for Identifying a Product," filed Dec. 22, 2000, 48 total pages.

U.S. Appl. No. 09/858,322, entitled "Pre-Qualifying Sellers During the Matching Phase of an Electronic Commerce Transaction," filed May 15, 2001, 40 total pages.

U.S. Appl. No. 09/858,269, entitled "Facilitating Electronic Commerce Transactions Using Buyer Profiles," filed May 15, 2001, 41 total pages.

U.S. Appl. No. 09/859,266, entitled "Facilitating Electronic Commerce Transactions Using a Shared Product Data Repository," filed May 16, 2001, 39 total pages.

U.S. Appl. No. 09/884,393, entitled "Distributed Processing of Search Results in an Electronic Commerce System," filed Jun. 18, 2001, 47 total pages.

U.S. Appl. No. 09/884,007, entitled "Content Enhancement in an Electronic Marketplace," filed Jun. 18, 2001, 44 total pages.

U.S. Appl. No. 09/892,300, entitled "Providing Market Feedback Associated with Electronic Commerce Transactions to Sellers," filed Jun. 26, 2001, 43 total pages.

U.S. Appl. No. 09/895,654, entitled "Translation Between Product Classification Schemas," filed Jun. 28, 2001, 39 total pages.

U.S. Appl. No. 09/895,525, entitled "Association of Data with a Product Classification Schema," filed Jun. 28, 2001, 50 total pages.

U.S. Appl. No. 09/895,490, entitled "Third Party Certification of Content in Electronic Commerce Transactions," filed Jun. 29, 2001, 42 total pages.

U.S. Appl. No. 09/895,489, entitled "Protecting Content from Unauthorized Reproduction," filed Jun. 29, 2001, 46 total pages.

U.S. Appl. No. 09/895,894, entitled "Protecting Content from Unauthorized Reproduction," filed Jun. 29, 2001, 44 total pages.

AT&L Knowledge Sharing System "Ask a Professor—Question & Answer Detail," 2 pages.

* cited by examiner

| 152a | 152b | 152c | 152d | 152e | | 152n |
|---|---|---|---|---|---|---|
| PID | PRODUCT TYPE | MANUFACTURER | INK COLOR | TIP SIZE | ... | PRICE |
| 23 | BALL POINT | ABC | BLUE | MEDIUM | ... | 0.12 |
| 29 | BALL POINT | ABC | BLACK | MEDIUM | ... | 0.12 |
| 56 | BALL POINT | XYZ | BLACK | MEDIUM | ... | 0.13 |
| 98 | BALL POINT | XYZ | GREEN | MEDIUM | ... | 0.13 |
| . | . | . | . | . | ... | . |
| 12 | FELT TIP | XYZ | BLACK | BROAD | ... | 0.17 |
| 16 | FELT TIP | ABC | BLACK | BROAD | ... | 0.18 |
| 56 | FELT TIP | ABC | RED | FINE | ... | 0.16 |
| 123 | FELT TIP | XYZ | RED | FINE | ... | 0.16 |
| . | . | . | . | . | ... | . |
| 2 | ROLLER BALL | XYZ | BLUE | FINE | ... | 0.25 |
| 59 | ROLLER BALL | XYZ | BLACK | FINE | ... | 0.25 |
| 143 | ROLLER BALL | XYZ | BLACK | MEDIUM | ... | 0.22 |
| 456 | ROLLER BALL | ABC | RED | EXTRA FINE | ... | 0.29 |
| . | . | . | . | . | ... | . |
| . | . | . | . | . | ... | . |

FIG. 3

TRANSLATION BETWEEN PRODUCT CLASSIFICATION SCHEMAS

TECHNICAL FIELD OF THE INVENTION

This invention relates to electronic commerce and more particularly to translation between product classification schemas.

BACKGROUND OF THE INVENTION

Due to the ever-increasing popularity and accessibility of the Internet as a medium of communication, the number of business transactions conducted using the Internet is also increasing, as are the numbers of buyers and sellers participating in electronic marketplaces providing a forum for these transactions. The majority of electronic commerce ("e-commerce") transactions occur when a buyer determines a need for a product, identifies a seller that provides that product, and accesses the seller's web site to arrange a purchase of the product. If the buyer does not have a preferred seller or if the buyer is purchasing the product for the first time, the buyer will often perform a search for a number of sellers that offer the product and then access numerous seller web sites to determine which seller offers certain desired product features at the best price and under the best terms for the buyer. The matching phase of e-commerce transactions (matching the buyer with a particular seller) is often inefficient because of the large amount of searching involved in finding a product and because once a particular product is found, the various offerings of that product by different sellers may not be easily compared.

SUMMARY OF THE INVENTION

According to the present invention, disadvantages and problems associated with previous e-commerce techniques have been substantially reduced or eliminated.

In one embodiment of the present invention, a schema translation tool includes a mapping module that receives information regarding a source schema and a target schema. The source and target schemas each include a taxonomy that includes a hierarchy of classes into which products may be categorized. At least the source schema further includes a product ontology, including one or more product attributes, that is associated with one or more of the classes. The mapping module associates one or more source classes of the source schema with one or more target classes of the target schema. The schema translation tool further includes an ontology generation module that generates a product ontology for each of the target classes based on the product ontologies of the associated source classes.

Particular embodiments of the present invention may provide one or more technical advantages. For example, certain embodiments of the present invention may be used in association with a global content directory that categorizes a number of different products and provides a portal through which a buyer may search for particular products and establish communications with an appropriate seller of a desired product. The global content directory may use one or more schema to categorize the various products. These schema include a taxonomy, which is a hierarchy of classes into which the products may be categorized. However, a buyer or other user of the global content directory may prefer that the products be categorized according to a taxonomy not provided by the global content directory.

Therefore, certain embodiments of the present invention provide a translation tool that translates a source schema having one taxonomy to a target schema having a different taxonomy. Furthermore, one or more of the classes included in either of the taxonomies may have an associated ontology, which includes one or more attributes associated with a product or a seller of a product. The translation tool provided by particular embodiments may also translate the ontology of classes in the source schema to associated classes in the target schemas. Therefore, although the global content directory may initially provide only a limited number of schemas in which products are categorized, embodiments of the present invention may be used to translate these schemas to different schemas desired by particular buyers. Such a translation provides such buyers with a more effective and efficient product transaction process and attracts a larger number of variety of buyers to the global content directory.

Other technical advantages may be readily apparent to those skilled in the art from the following figures, description, and claims.

BRIEF DESCRIPTION OF THE DRAWINGS

To provide a more complete understanding of the present invention and the features and advantages thereof, reference is made to the following description taken in conjunction with the accompanying drawings, in which:

FIG. 3 illustrates an example table of a seller database;

DESCRIPTION OF EXAMPLE EMBODIMENTS

Figure 1:
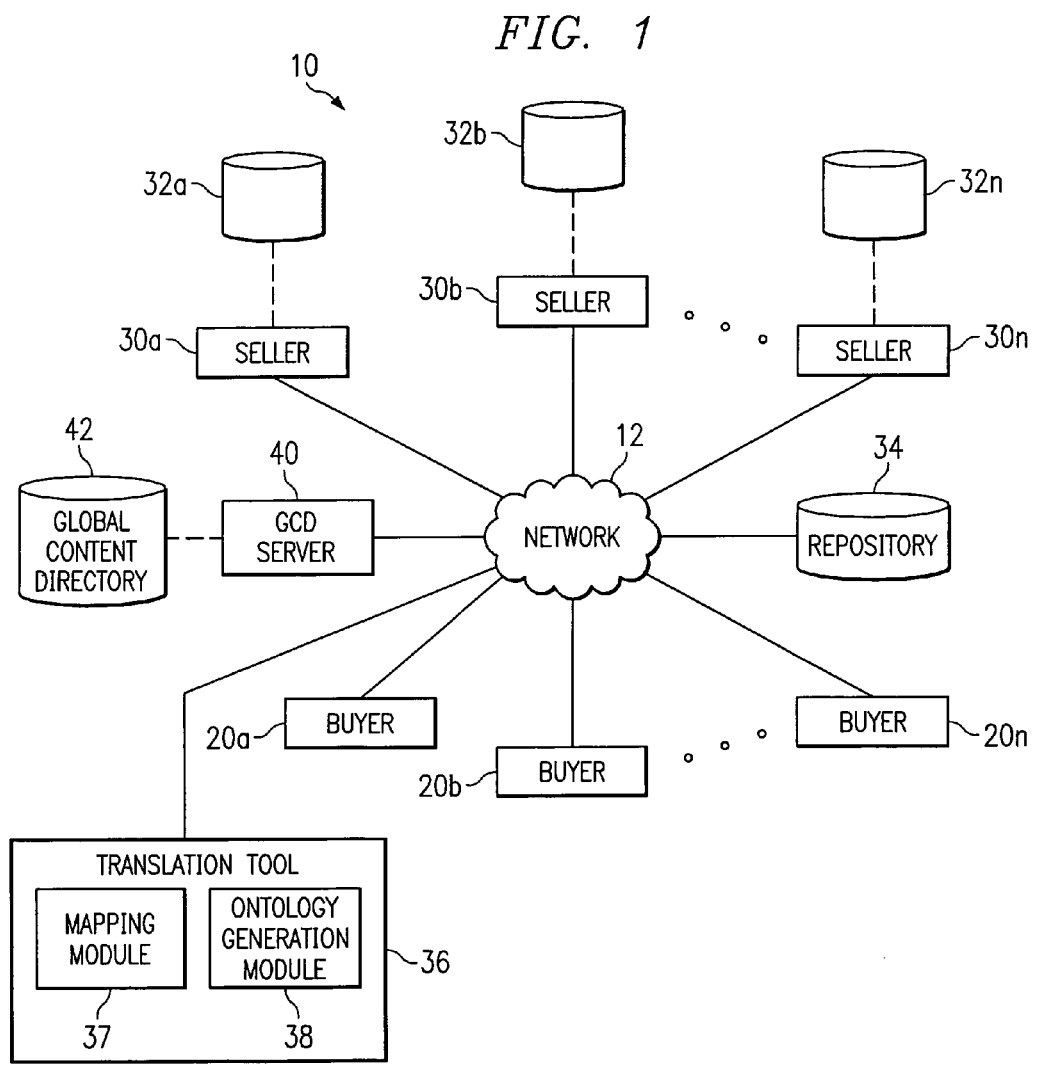
FIG. 1 illustrates an example electronic commerce system.

FIG. 1 illustrates an example system 10 that includes a network 12 coupling buyers 20, sellers 30, and a global content directory (GCD) server 40. System 10 enables electronic commerce ("e-commerce") transactions between buyers 20 and sellers 30 through the use of a GCD 42 supported by GCD server 40. GCD 42 may be internal or external to GCD server 40. Network 12 may include any appropriate combination of public and/or private networks coupling buyers 20, sellers 30, and GCD server 40. In an example embodiment, network 12 includes the Internet and any appropriate local area networks (LANs), metropolitan area networks (MANs), or wide area networks (WANs) coupling buyers 20, sellers 30, and GCD server 40 to the Internet. Since the Internet is accessible to the vast majority of buyers and sellers in the world, the present invention potentially includes all of these buyers and sellers as buyers 20 and sellers 30 associated with system 10. However, the use of the term "global" should not be interpreted as a geographic limitation necessarily requiring that GCD 42 provide directory services to buyers 20 and sellers 30 around the world (or in any other particular region) or that the content of GCD 42 be from all over the world (or from any other particular region).

Although buyers 20 and sellers 30 are described as separate entities, a buyer 20 in one transaction may be a seller 30 in another transaction, and vice versa. Moreover, reference to "buyer" or "seller" is meant to include a person, a computer system, an organization, or another entity where appropriate. For example, a buyer 20 may include a computer programmed to autonomously identify a need for a product, search for that product, and buy that product upon identifying a suitable seller. Although buying and selling are primarily described herein, the present invention contemplates any appropriate e-commerce transaction. Moreover, reference to "products" is meant to include goods, real property, services, information, or any other suitable tangible or intangible things.

A typical e-commerce transaction may involve a "matching" phase and a "transactional" phase. During the matching phase, a buyer 20 may search for a suitable product (meaning any good, real property, service, information, or other tangible or intangible thing that may be the subject of an e-commerce transaction) offered by one or more sellers 30, identify the most suitable seller 30 (which may involve, for example, identifying the seller 30 offering the lowest price), and contact that seller 30 to enter the transactional phase. During the transactional phase, the buyer 20 and seller 30 may negotiate a contract for the sale of the product (which may involve, for example, more clearly defining the subject of the transaction, negotiating a price, and reaching an agreement on supply logistics) and generate a legal document embodying the terms of the negotiated contract. To identify the most suitable seller 30 during the matching phase without the use of GCD 42, a buyer 20 may have to access numerous seller web sites to determine which seller 30 offers certain desired features of the product at the best price. Sellers 30 may each provide one or more databases 32, such as relational databases, that include data identifying the products available from sellers 30 and their features. Each database 32 may be accessed through the associated seller's web site or in any other appropriate manner. The multiple one-to-one (one buyer 20 to one seller 30) searches that this process requires are inefficient and expensive because of the large amount of searching involved in finding a product and because the various offerings of that product by different sellers 30 may not be easily compared.

Alternatively, multiple sellers 30 may be grouped in an electronic marketplace according to the products they provide and a buyer 20 may search the offerings of the multiple sellers 30 at a single web site. However, if buyer 20 wishes to obtain several different types of products, buyer 20 may have to go to several different types of marketplaces. Furthermore, there may be numerous competing marketplaces that buyer 20 has to search to perform the matching phase of a transaction for a particular product. One potential method of addressing this problem is to create a global product database that potentially includes data identifying the features of all the products that any buyer may wish to obtain. Therefore, the global database would include the combined contents of every database 32 associated with every seller 30. However, such a global database would have many problems. For example, the sheer size of the database would make it difficult to search and thus the database would suffer from performance problems. In addition, it would be difficult to allow large numbers of buyers 20 to search the database at once. Furthermore, all sellers 30 would be required to access the global database to update their information and the entire database would have to be updated each time a change is made. Many other problems might also exist.

A solution to the above problems, at least in part, is GCD 42. GCD 42 is a universal directory of the contents of multiple seller databases 32 (and potentially all seller databases 32). GCD 42 may be implemented using one or more servers 40 or other computers located at one or more locations. Most or all of the content in these seller databases 32 remains stored in databases 32, but this content is accessible using GCD 42. Therefore, like the global database described above, GCD 42 provides buyers 20 with access to product data relating to a multitude of products (and potentially seller data relating to one or more sellers 30 of the products), but unlike the global database, GCD 42 does not attempt to store all of this data in one enormous database. Where appropriate, reference to "data" is meant to include product data (meaning information reflecting values for certain attributes of a product), seller data (meaning information reflecting values for certain seller attributes), or both product data and seller data.

GCD 42 provides a directory of products using a directory structure in which products are organized using a hierarchical classification system. A buyer 20 may navigate or search the directory to find a particular product class into which products are categorized. The product data (and potentially seller data) associated with a product included in a product class may actually be stored in and obtained by GCD 42 from a seller database 32. However, the requested data may be transparently provided to buyer 20 such that all of the product data may appear to buyer 20 as being included in GCD 42. Although product and/or seller data has primarily been described as being stored in seller databases 32, the present invention contemplates product data being stored in any suitable manner and being retrieved from any suitable sources. For example, system 10 may include a shared data repository 34 that contains product data and/or seller data that may be combined with data from one or more seller databases 32, as described in further detail below. Furthermore, as is described in further detail below with reference to FIGS. 4 and 5, system 10 may include a translation tool 36 including a mapping module 37 and an ontology generation module 38 that may be used to translate between different mechanisms used to organize the product data stored in seller databases 32 and/or repository 34.

Figure 2:
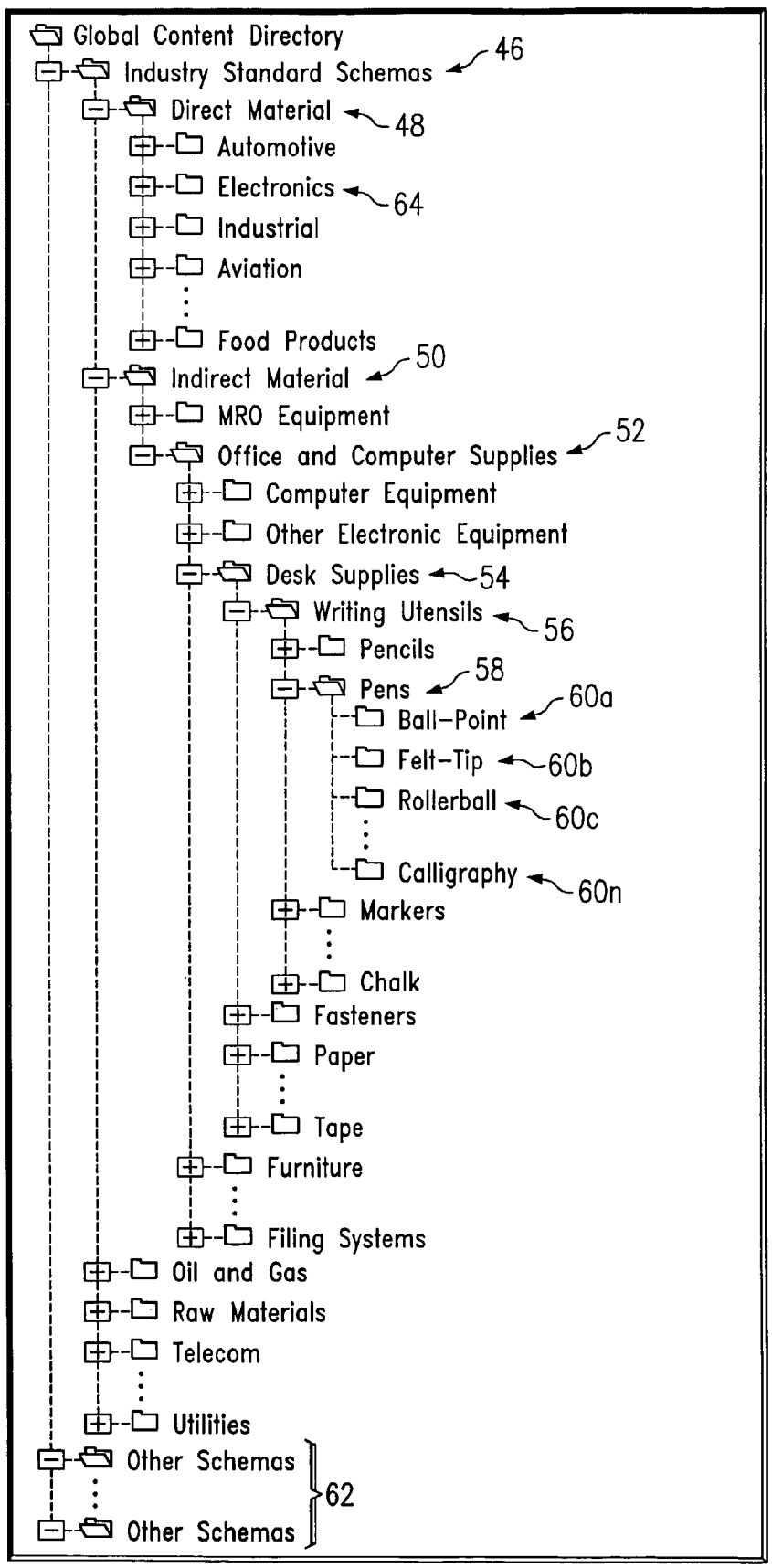
FIG. 2 illustrates an example directory structure of an example global content directory.

FIG. 2 illustrates an example directory structure 44 of an example GCD 42. Products categorized in GCD 42 may be organized according to schemas. A schema may include a set of product classes (which may be referred to as a "taxonomy") organized in a hierarchy, each class being associated with a set of product features, characteristics, or other product attributes (which may be referred to as a "product ontology"). For example, pens may have different kinds of tips (such as ball point or felt tip), different tip sizes (such as fine, medium, or broad), and different ink colors (such as blue, black, or red). Accordingly, a schema may include a class corresponding to pens that has a product ontology including tip type, tip size, and color, or other appropriate attributes. Within a class, products may be defined by product attribute values (such as, for example, ball point, medium tip, blue ink). Reference to "value" is meant to include any appropriate data reflecting an instance of a product attribute or a seller attribute. Product attribute values and seller attribute values may include numbers, letters, figures, characters, symbols, or other suitable information for describing a product or a seller, respectively. In one embodiment, a product ontology may be divided into entry-required attributes (meaning attributes for which a value has to be provided) and entry-optional attributes (meaning attributes for which a value is optional), and these categories may be further divided into commercial features and design features (or any other suitable divisions).

In addition to a taxonomy and product ontologies, a schema may include a set of attributes for each seller (which may be referred to as a "seller ontology"). Such attributes may include geographic restrictions (such as served markets), currencies accepted by each seller, collaboration tools accepted by each seller, contract terms accepted by each seller, types of contracts accepted by each seller, levels of buyer credit required by each seller, and any other suitable seller attributes. Similar to a products within a product class, sellers offering products within a product class may be defined by seller attribute values corresponding to seller attributes. Accordingly, a schema may include a set of classes, each including one or more products, and each class may be associated with a set of product attributes and a set of seller attributes.

In example directory structure 44, products may be organized and cataloged according to industry standard schemas 46 or other appropriate schemas, as described below. Within industry standard schemas 46, there are two example classes: a direct materials class 48 and an indirect materials class 50. Each of these classes 48 and 50 includes several sub-classes (which may themselves include sub-classes). Therefore, the numerous classes of directory structure 44 form a "tree-like" hierarchical structure into which products may be categorized. For example purposes, certain portions of directory structure 44 are "expanded" in FIG. 2 to show various levels of classes. The "level" of a class is indicated by the number of other classes between that class and a root class. For example, indirect material class 50 is at the same level in directory structure as direct material class 48. Indirect material class 50 may include an office and computer supplies class 52, which includes a desk supplies class 54, which includes a writing utensils class 56. Furthermore, writing utensils class 56 includes a pens class 58, which includes numerous pen type classes 60a-60n ("n" indicating that any number of classes 60 may be included in pens class 58). Each of classes 50, 52, 54, 56, 58, and 60 is located at a different level of directory structure 44. A class at any level in directory structure 44 may include one or more sub-classes, those sub-classes may include one or more sub-classes, and so on until a desired specificity of categorization is reached. A series of classes from a highest level class (the broadest class) to a lowest level class (the most specific class) may be referred to as a "branch" of directory structure 44. For example, classes 46, 48, 50, 52, 54, 56, 58, and 60b form one branch of directory structure 44.

A buyer 20 may navigate through directory structure 44 by expanding or collapsing various classes as desired. For example, FIG. 2 illustrates an expansion of certain classes of directory structure 44 to reach a felt-tip pen class 60b. Once a buyer 20 has navigated to a class that is specific enough for buyer 20 (and/or a "leaf" class that is at the end of a branch), buyer 20 may perform a search for products within that class. For example, buyer 20 can search for all products in writing utensils class 56 that are blue felt-tip pins having medium tips. Alternatively, if buyer 20 navigates to the end of a branch of directory structure 44 (to a leaf class), such as felt-tip pen class 60b, GCD 42 may then enable buyer 20 to search for such pens that have blue ink and medium tips (which may reach the same result as the search above).

Buyer 20 may also search for sellers matching one or more seller attribute values within a product class. For example, in addition to searching for all products in writing utensils class 56 that are blue felt-tip pins having medium tips, buyer 20 may search for sellers 30 serving Texas that accept U.S. dollars. Buyer 20 may search for products matching certain product attribute values and sellers matching certain seller attribute values in any appropriate manner. In one embodiment, for example, buyer 20 provides search criteria including both values for product attributes and for seller attributes (search criteria may instead be generated automatically, in whole or in part, as described below), and server 40 searches for products that match the product attribute criteria and are offered by sellers matching the seller attribute criteria. In another embodiment, buyer 20 provides only product attribute values as search criteria, and server 40 limits its search for products matching the product attribute criteria to databases 32 associated with sellers 30 known to match seller attribute criteria that buyer 20 may want according to a buyer profile or otherwise.

As described above, in one embodiment product data (at least product data more detailed than data provided by a taxonomy) and seller data are not stored in GCD 42, but are stored in databases 32. For example, a seller 30 may maintain a relational database 32 that includes a plurality of tables containing product attribute values for a variety of products and seller attribute values for each product, a set of products, or all of the products offered by seller 30. Product data and seller data may be integrated into one or more tables or may be segregated into different tables. Moreover, product data and seller data for a seller 30 may be stored in the same or separate databases. One or more pointers may be associated with each class to identify the location of one or more databases 32 that include product data and/or seller data for products contained in that class or to identify particular data in databases 32. Therefore, GCD 42 may execute a search for products in databases 32 identified by a pointer corresponding to a user-selected (or automatically selected) class. GCD 42 may also return the network location (such as a uniform resource locator (URL) or other network address) of the database 32 to buyer 20 so that buyer 20 may independently access database 32. Databases 32 may be searched using any appropriate method including, but not limited to, a structured query language (SQL) query.

GCD 42 may be implemented using the lightweight directory access protocol (LDAP), which enables directories to be provided using the tree-like structure described above. However, any other appropriate technique or protocol for creating GCD 42 may alternatively be used and GCD 42 may have any appropriate structure. Furthermore, GCD 42 may be an object-oriented directory (which is also provided by LDAP) such that each class in directory structure 44 includes the attributes of parent classes in which the class is a sub-class. In this embodiment, a product class listed at the end of a branch of the tree structure (a leaf class) includes all of the attributes of its parent classes in the branch. Furthermore, each product included in a database 32 may be an object that includes all the attributes of the classes in which the product is included. Thus, when a search is performed from a leaf class of directory structure 44, the search query may automatically include any appropriate attributes of parent classes of the leaf class.

For example, if a buyer 20 has navigated through directory structure 44 to felt-tip pens class 60b, a search performed by buyer 20 (or by GCD 42 on behalf of buyer 20) from felt-tip pens class 60b may automatically be limited to a search for felt-tip pens and buyer 20 may introduce additional desired search criteria (such as blue ink and medium tip). Therefore, if a database 32 searched includes product data relating to a variety of writing utensils, a search of database 32 may be automatically limited by GCD 42 to only include felt-tip pens within that database 32. Buyer 20 may also identify additional product attribute values and/or seller attribute values as additional search criteria.

FIG. 3 illustrates an example table 150 that may be included in a seller database 32 and/or repository 34. Database 32 and repository 34 may include one or more tables 150, and each table 150 may contain data relating to one or more products. For example, example table 150 includes data relating to different types of pens. Table 150 may also include data for other types of products (for example, other types of office supplies), or such data may be contained in other tables 150 in database 32 and/or repository 34. Table 150 includes a plurality of columns 152 that each include data relating to a particular product attribute or seller attribute. Although an example number of columns 152 including example product attribute values and seller attribute values are illustrated, it should be understood that any appropriate number and type of product attributes, seller attributes, or other categories of data may be included in table 150. Moreover, as described briefly above, seller data and product data may be segregated into different tables instead of being integrated into the same table as shown in example table 150.

Table 150 also includes a number of rows 154 that may each correspond to a particular product and that each include values for one or more of the product attributes and seller attributes. Each of the values (which may be numeric, textual, or in any other appropriate format) is located at the intersection of the row 154 associated with a particular product and the column 152 that includes a particular product attribute or seller attribute. Each of these intersections may be referred to as a field or cell 156 of table 150. Where seller data and product data are integrated, each row 154 may contain all of the product data and seller data for the product corresponding to that row 154. Alternatively, there may be a row or set of rows dedicated to seller data that may apply to all products offered by a seller 30 or a subset of all such products. Where seller data and product data are segregated, each row in the seller data table may correspond to a set of seller attribute values that may be linked to a set of one or more products in the product data table such that seller data for a product may be accessed when product data for that product is accessed, and vice versa.

The data in one or more columns 152 of table 150 may be indexed to increase the speed with which database reads may be conducted. For example, the fields 156 of ink color column 152d and tip size column 152e may be indexed so that a database query for a pen having a particular ink color and tip size may be quickly performed. Data in table 150 may be indexed using any appropriate database indexing technique. The typical result of such indexing is that when GCD 42 or a buyer 20 requests indexed data from a database 32 and/or repository 34, the associated database management system (or other appropriate interface to database 32 and/or repository 34) does not have to search through every field 156 in the tables 150 included in database 32 and/or repository 34 to locate the requested data. Instead, the data may be indexed such that when a query is submitted for products having certain product attribute values and/or sellers 30 having certain seller attribute values that have been indexed, the database management system already knows the locations of such products in table 150 and may return data associated with these products without searching the entire table 150 or database 32 and/or repository 34 for the products. For example, if the ink color fields 156 and tip size fields 156 of columns 152d and 152e, respectively, are indexed, the index will typically identify the location of all products having black ink and a medium tip size.

If a query is submitted that also specifies a value of one or more non-indexed product attributes (for example, a query for pens manufactured by ABC Company, if the manufacturer fields 156 in column 152c are not indexed) and/or seller attributes, then the associated database management system may perform a search of database 32 and/or repository 34 for products that include the specified value of the one or more non-indexed attributes or seller attributes. However, such a search may be limited to the products already identified (using the index) as including specified values of indexed attributes (for example, pens having black ink and a medium tip) and/or seller attributes that are also included in the search. Therefore, the amount of time required to perform the search may be reduced even though one or more of the product attribute values or seller attribute values that are searched for are not indexed.

Returning to FIG. 2, when GCD 42 has performed a search of the databases 32 and/or repository 34 (or particular tables thereof) identified by a pointer or pointers associated with a class that buyer 20 has selected or that has been automatically selected, GCD 42 may return product data and/or seller data associated with one or more products matching the search criteria. GCD 42 may integrate the product data and/or seller data resulting from the search into directory structure 44 so that the data appears to buyer 20 as being part of GCD 42. GCD 42 may alternatively present the results of the search in any other appropriate manner. Each product resulting from the search may be an object which is unique instance of the class in which buyer 20 is searching. Furthermore, each such object (and its location) may be uniquely identified using a numbering scheme corresponding to directory structure 44.

In summary, a buyer 20 may search for a product matching certain product attribute values available from a seller matching certain seller attribute values using GCD 42 and thus eliminate or reduce the need for buyer 20 to individually search numerous seller databases 32 to find the desired product available from a suitable seller. GCD 42 provides access to product and/or seller data relating to these numerous products using directory structure 44, which organizes products using a hierarchical, object-oriented classification system. Buyer 20 may navigate or search directory structure 44 to find a particular classification of products and various information associated with the products within this classification, initiate a search of databases 32 including product and/or seller data relating to a product, and then communicate with an appropriate database 32 through GCD server 40 or otherwise. Such access to vast numbers of products is provided without the requirement that all data about the products and/or sellers be stored in a global database. Instead, this data may be stored in seller databases 32 that can be readily accessed using GCD 42.

Although example directory structure 44 may use industry standard schemas 46 as described above with reference to FIG. 2, any other appropriate schemas 62 may be used in addition to or instead of industry standard schemas 46. For example, while industry standard schemas 46 may be organized from a seller's viewpoint, other schemas 62 may be used that organize products from a buyer's viewpoint. For example, a buyer 20 may wish to furnish a kitchen of a new house with various products, such as appliances, window treatments, paint, cabinetry, plumbing, dishes, and cooking utensils. Using one schema 62, these products may be organized into a variety of unrelated classes based on certain features of the products (for example, certain kitchen appliances may be categorized in an electronics class 52 of directory structure 44 while paint may be categorized into an industrial class 52). However, another example schema 62 may categorize all such products into a home products class (which may include several classes further categorizing the products, such as a kitchen products class which includes a kitchen appliances class, which includes a refrigerator class, and so on). Therefore, the same product may be included in multiple schemas 62. These alternative schemas may be included in directory structure 44 and may be stored as a part of or separate from GCD 42.

Furthermore, although GCD 42 may not provide an alternative schema desired by a particular user, a schema 46 or 62 provided by GCD 42 may be translated to the alternative schema desired by the user. As described above, the schema 46 or 62 provided by GCD 42 include "rich" content in that these schemas 46 or 62 include both a taxonomy (hierarchy of product or seller classes) and an ontology (product and/or seller attributes associated with each class). However, many commonly used schema, such as the United Nations Standard Products and Services Classification (UNSPSC) schema, include a taxonomy but do not include an ontology. Therefore, to translate a GCD schema 46 or 62 to such an "ontology-less" schema, the taxonomy of the GCD schema 46 or 62 is mapped to the taxonomy of the ontology-less schema and an ontology is created for each class in the ontology-less schema.

Figure 4:
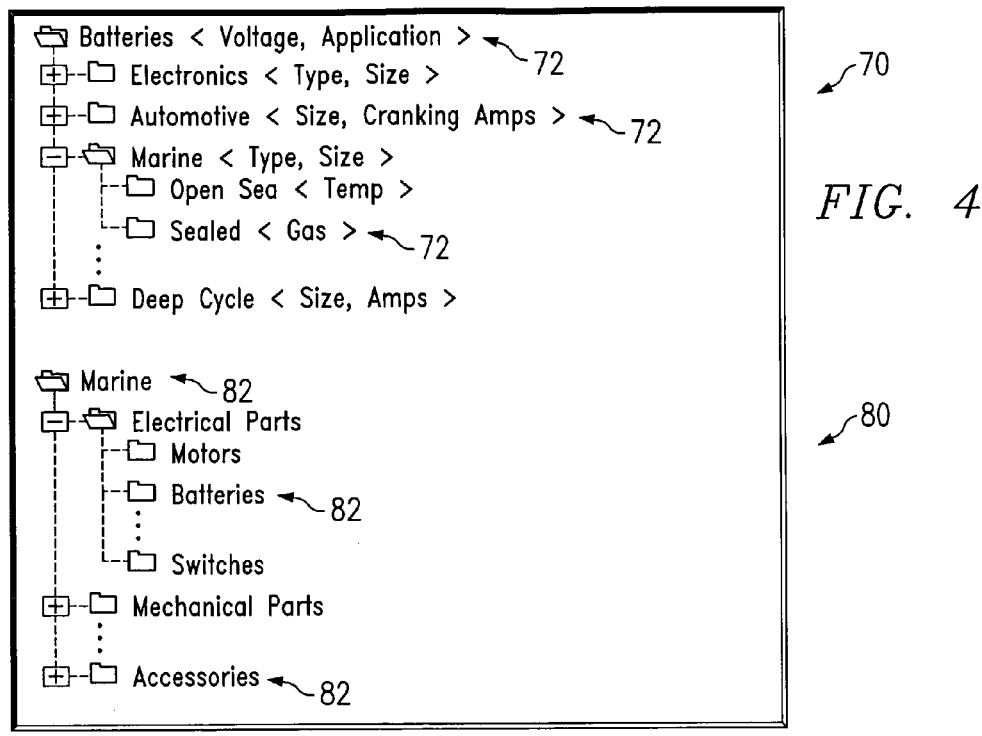
FIG. 4 illustrates an example portion of a schema including a taxonomy and product ontology and an example portion of a schema including only a taxonomy.

FIG. 4 illustrates an example portion of a GCD schema 70 (including a taxonomy and product ontology) and an example portion of an ontology-less schema 80 (including only a taxonomy). Although a seller ontology is not associated with schema 70 in FIG. 4, it should be understood that the following description applies equally to product and seller ontologies. The first step involved in translating schema 70 to schema 80 is to map the classes 72 of schema 70 to classes 82 of schema 80. For example, each leaf class 72 of schema 70 may be mapped to one or more classes 82 of schema 80 (multiple leaf classes 72 may be mapped to a single class 82). The process of mapping classes 72 to classes 82 may be performed by a user of system 10, such as a buyer 20, a seller 30, or a user associated with GCD server 40. The user may use mapping module 37 of translation tool 36 to associate a leaf class 72 and/or particular pointers associated with a leaf class 72 with one or more classes 82. For example, mapping module 37 may present a graphical representation of classes 72 and 82 to the user and allow the user to "drag and drop" (using a mouse or other input device) an icon representing a class 72 onto another icon representing a class 82. Multiple leaf classes 72 included in the same parent class may be mapped to a class 82 by mapping the parent class 72 to the class 82. Furthermore, mapping module 37 may use any other appropriate technique for mapping one or more classes 72 to one or more classes 82. Translation tool 36 and mapping module 37 may be implemented as any appropriate combination of software and/or hardware associated with GCD server 40 or with any other appropriate component of system 10.

After the leaf classes 72 of schema 70 have been mapped to classes 82 of schema 80, an ontology may be generated for classes 82 based on the ontology of the leaf classes 72 mapped to classes 82. This ontology creation process may be performed automatically by ontology generation module 38 of translation tool 36. As with mapping module 37, ontology generation module 38 may be implemented as any appropriate combination of software and/or hardware associated with GCD server 40 or with any other appropriate component of system 10. Furthermore, mapping module 37 and ontology generation module 38 may be associated with and executed by the same or by different computers. Ontology generation module 38 creates an ontology for a class 82 by determining the ontology of each leaf class 72 that was mapped to the class 82. The ontology for class 82 is then defined as the intersection of the ontologies of the classes 72 that were mapped to class 82. If a single class 72 was mapped to class 82, the ontology of class 82 may be the ontology of the single class 72. As an example, referring to FIG. 4, assume that the "Open Sea" and "Sealed" leaf classes 72 (which are included in a "Marine" parent class 72 which is included in a "Batteries" parent class 72) are mapped to a "Batteries" class 82 (which is included in a "Electrical Parts" parent class 82 which is included in a "Marine" parent class 82). Since "Batteries" class 82 does not include specific classes 82 for "open sea" and "sealed" marine batteries, both the "Open Sea" and "Sealed" leaf classes 72 may be mapped to "Batteries" class 82. Therefore, "Batteries" class 82 may include the common attributes from the ontologies of these leaf classes 72.

As described above, the product ontology of a particular class 72 includes the product attributes associated with the class 72 plus the product attributes associated with each of the parent classes 72 of the class 72 (the product attributes associated with each class are indicated in brackets next to the class name in FIG. 4). Therefore, the ontology associated with "Open Sea" class 72 is as follows: <voltage, application, type, size, temp>(assuming that "Batteries" class 72 has no parent class 72 having associated product attributes). Similarly, the ontology associated with "Sealed" class 72 is as follows: <voltage, application, type, size, gas>. The new ontology of "Batteries" class 82 may then be the intersection of these ontologies, which is as follows: <voltage, application, type, size>.

The product attributes that are not included in the intersection of the ontologies of the classes 72 mapped to a particular class 82 ("temp" and "gas" in the above example) may be used to create subclasses 82 of the particular class (and the pointers associated with the corresponding class 72 may be associated with each subclass 82) or the product attributes may not be included in the ontology of any class 82. Alternatively, the ontology of a particular class 82 may be created from the union of the ontologies of the classes 72 mapped to the class 82. However, in such a case, not all of the products associated with the class 82 (which were associated with the corresponding classes 72) will have associated values for each of the product attributes. Furthermore, any other appropriate technique may be used to create an ontology for a class 82 from the ontologies of classes 72.

After ontologies have been generated for the classes 82 to which classes 72 were associated, there may be classes 82 having the same parent class 82 that have common product attributes in their ontologies. For example, "Batteries" class 82 may have a generated ontology of <voltage, application, type, size>and the other classes 82 included in "Electrical Parts" class 82 may also have generated ontologies. The ontology for "Electrical Parts" class 82 may be formed from the intersection of these ontologies. For example, if all the ontologies of the classes 82 included in "Electrical Parts" class 82 include "voltage" and "application" as attributes, then these two attributes may form the ontology for "Electrical Parts" class 82. These two attributes may then be removed from the attributes associated with the classes 82 under the "Electrical Parts" class 82 since these classes 82 by definition include the attributes of "Electrical Parts" class 82 in their ontologies.

This process may be repeated for each class 82 of schema 80. For example, an ontology may be created for "Marine" class 82 from the intersection (if any) of the ontologies associated with the classes 82 included in "Marine" class 82 (such as "Electrical Parts" class 82). Therefore, in summary, each leaf class 72 of schema 70 is mapped to the most appropriate class or classes 82 of schema 80 and an ontology is created for these classes 82 from the associated mapped classes 72. Then based on the relationship between classes 82 for which an ontology has been generated and the other classes 82 in schema 80, ontologies may also be generated for these other classes 82, as described above, until all appropriate classes 82 have an associated ontology mapped from the ontology of classes 72 of schema 70.

Figure 5:
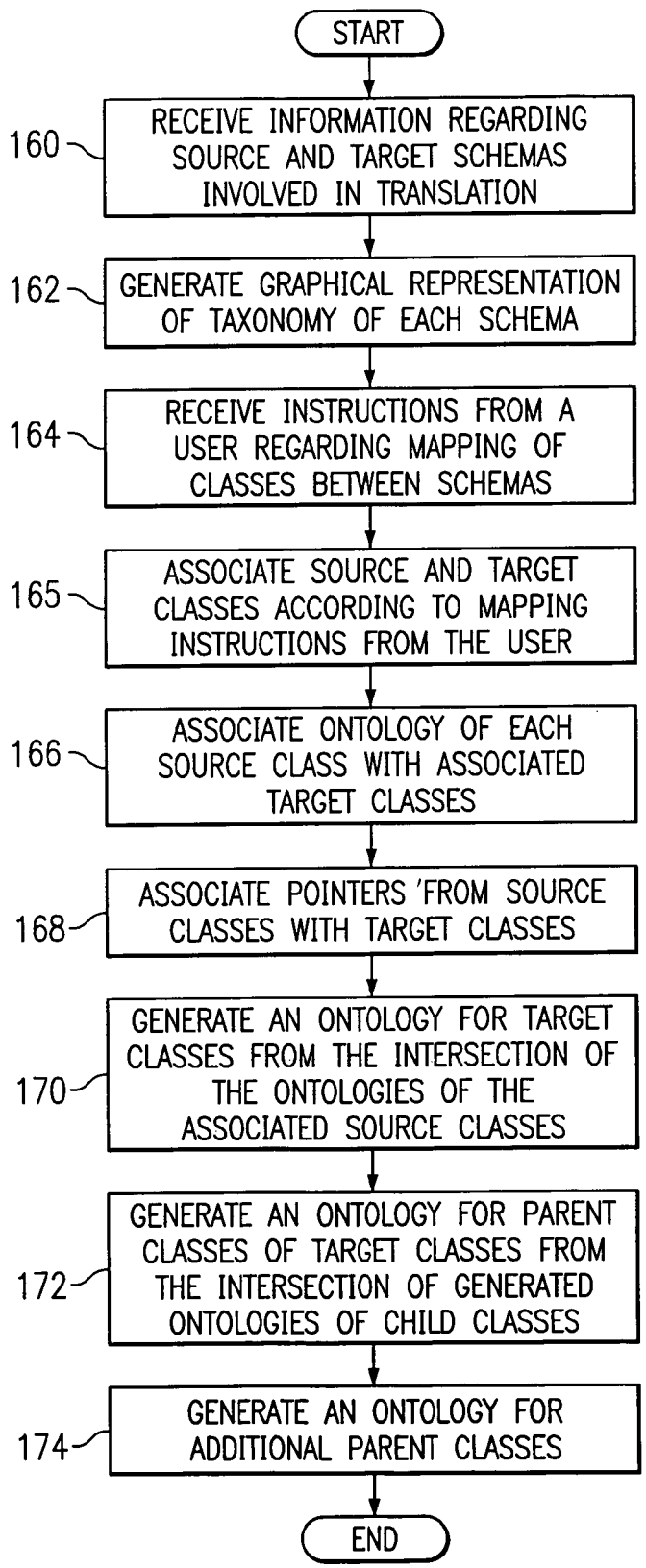
FIG. 5 illustrates an example method for translating between different schemas.

FIG. 5 illustrates an example method for translating between different schemas. The method begins at step 160 when mapping module 37 of translation tool 36 (or any other appropriate component used for schema translation) receives information regarding a source schema (such as schema 70) that is to be translated to a target schema (such as schema 80). This information may include, but is not limited to, the taxonomy and ontology of the source schema, the pointers to seller databases 32 and/or repository 34 associated with the classes of the source schema, and the taxonomy of the target schema. Mapping module 37 may be associated with GCD server 40 so that the information regarding a source or target schema associated with GCD 42 may be easily shared with mapping module 37. At step 162, mapping module 37 may generate a graphical representation of the taxonomy of the source and target schemas for presentation to a user. For example, mapping module 37 may generate a tree structure (similar to directory structure 44) to identify the hierarchy of classes that form the taxonomies. Mapping module 37 may communicate the graphical representation of the taxonomies to a user as a web page or other graphical representation using network 12. Mapping module 37 may also present information regarding the taxonomy of the source and target schemas in any other suitable form and using any other suitable communication technique.

Mapping module 37 receives instructions at step 164 from the user regarding the mapping of classes from the source schema to the target schema. For example, mapping module 37 may receive a series of communications from a user in response to the user "dragging and dropping" one or more classes from the source schema ("source classes") to one or more classes of the target schema ("target classes"). Any other appropriate instructions from the user regarding the mapping of classes may also be used. At step 165, mapping module associates one or more of the source classes with one or more of the target classes according to the mapping instructions received from the user. At step 166, mapping module 37 (or ontology generation module 38) associates the ontology of each source class with its associated target class or classes. Mapping module 37 also associates the pointers associated with each source class to the associated target class at step 168. Therefore, if a buyer 20 selects a particular target class and performs a search for products categorized in that class, the seller databases 32 and/or repository 34 including product data for these products will be searched.

At step 170, ontology generation module 38 generates an ontology for the target classes from the intersection of the ontologies of the source classes associated with each target class, as described above. Ontology generation module 38 may receive any required information regarding the mappings and the ontologies from mapping module 37 or data storage associated with translation tool 36. Ontology generation module 38 also generates, at step 172, an ontology for the parent classes of the target classes from the intersection of the ontologies of the child classes of each parent class, as described above. At step 174, ontology generation module 38 generates ontologies for the parent classes of the classes for which ontologies were created at step 172 (from the intersection of the child class ontologies) and also for all appropriate classes above these classes in the hierarchy of the taxonomy until an ontology has been so generated for all appropriate classes in the target schema, at which point the method ends.

Figure 6:
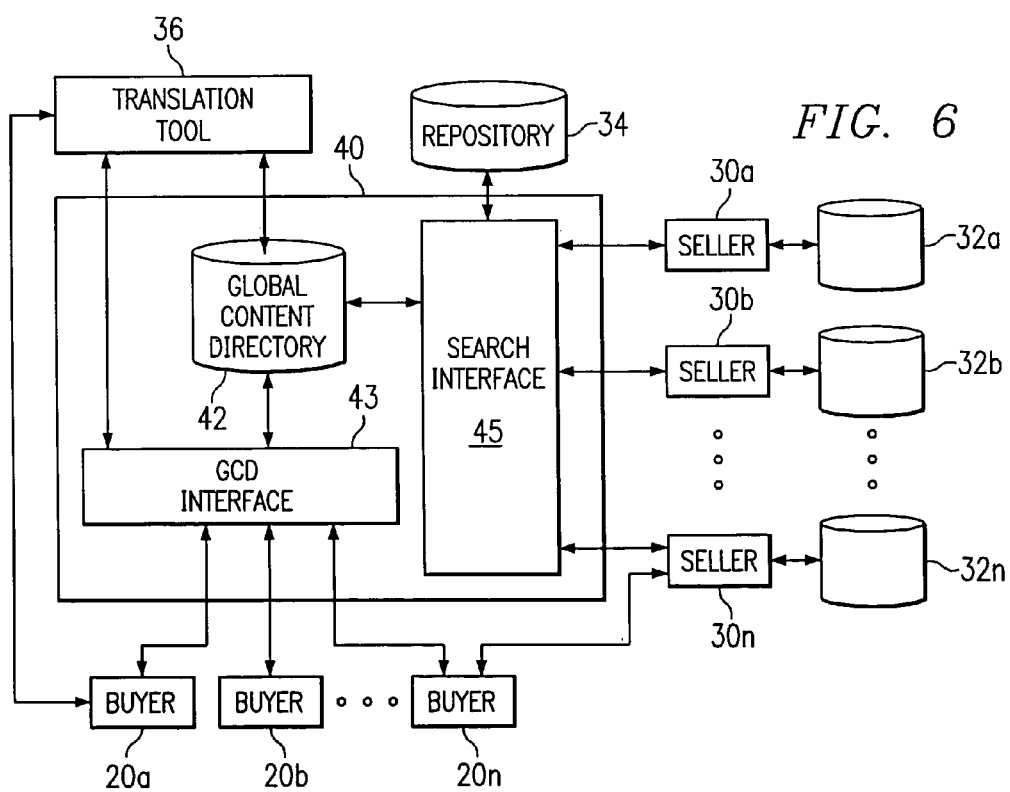
FIG. 6 illustrates an example electronic commerce system in further detail.

FIG. 6 illustrates an example e-commerce system 10 in further detail. As described above, numerous buyers 20 and sellers 30 may be coupled to GCD server 40 using network 12. Buyers 20 may access server 40 using a web browser or in any other appropriate manner and server 40 may provide buyers 20 with access to GCD 42 using a web server or in any other appropriate manner. Although GCD 42 is shown as being internal to GCD server 40, GCD 42 may be internal or external to GCD server 40, as described above. GCD server 40 may also include hardware and/or software for implementing one or more GCD interfaces 43. A buyer 20 may access server 40 and use a GCD interface 43 to search or navigate GCD 42 and/or seller databases 32. Information may be communicated between buyers 20, sellers 30, and GCD 42 using hypertext transport protocol (HTTP), extensible markup language (XML), simple object access protocol (SOAP), or any other suitable communication technique. Each buyer 20 and seller 30 may be issued a unique identifier so that the participants in a transaction facilitated by GCD 42 may be identified. Each buyer 20 and seller 30 may also be assigned a role with respect to a transaction. As described above, a buyer 20 in one transaction may be a seller 30 in another transaction, and vice versa.

In an example transaction, a buyer 20 may access a GCD interface 43 and perform a search of GCD 42. GCD interface 43 may allow buyer 20 to both navigate or "browse" the classes of GCD 42 and to search for a particular class or classes. For example, buyer 20 may either navigate GCD 42 to find a class into which pens are categorized or buyer 20 may search GCD 42 for class names including the word "pen." Any other suitable methods for identifying a particular class may also be used. Furthermore, as described above, if GCD 42 does not provide a taxonomy of product classes that is desired by the user, the user may initiate the translation of an existing schema into a desired schema using translation tool 36, which may be integral with or separate from GCD server 40. Buyer 20 may access translation tool 36 directly (using network 12), using GCD interface 43, or using any other appropriate technique. When buyer 20 has found a suitable schema and located the appropriate class for the product buyer 20 desires, buyer 20 may then request a listing of products in that class matching certain product attribute values. For example, if buyer 20 is browsing felt-tip pens class 60b, buyer 20 may request all products in class 60b (felt-tip pens) that have red ink and a fine tip and that are sold by a seller 30 located in the United States.

A search interface 45, or any other appropriate component of GCD server 40, may facilitate such a request by searching or requesting searches of repository 34 and/or seller databases 32 identified by one or more pointers associated with felt-tip pens class 60b, as described above. Search interface 45 may provide buyer 20 a search form in which to enter one or more search criteria. The types of search criteria that may be used may be identified in the search form or buyer may be allowed to perform a general search of databases 32 and/or repository 34 for certain terms. For example, search interface 45 may provide buyer 20 with a search form tailored for class 60b that includes fields where buyer 20 can specify a desired ink color, tip thickness, or any other appropriate product-related or seller-related criteria. In one embodiment, the fields of the search form correspond to some or all of the product attributes within the product ontology and/or seller attributes within the seller ontology corresponding to the product class that has been selected, and buyer 20 may enter values for the product attributes and seller attributes in the corresponding search form fields. In lieu of a search form, search interface 45 may instead provide a single field where buyer can enter in desired search terms, such as "red" and "fine" (multiple search terms may be entered using Boolean operators or any other appropriate technique).

Search interface 45, or any other appropriate component of GCD server 40, may also facilitate search requests by accessing a buyer profile for buyer 20 containing information compiled from previous search requests made by buyer 20, previous e-commerce transactions involving buyer 20, or other events or actions on the part of buyer 20. For example, a buyer profile may contain a list of sellers 30 matching seller attribute values that buyer 20 may want. Such a list may be compiled from the results of previous searches by buyer 20. Search interface 45 may access the profile for buyer 20 for any suitable purpose. In one embodiment, search interface 45 may access the profile for buyer 20 to automatically generate search criteria, such as product attribute values and/or seller attribute values, for a search. Search interface 45 may also access the profile for buyer 20 to limit its search for products matching product attribute values provided by buyer 20 (or generated automatically) to databases 32 associated with sellers 30 known to match seller attribute values that buyer 20 may want (and/or data in repository 34 associated with such sellers 30). Based on search criteria provided by buyer 20 or automatically generated, search interface 45 may communicate a query to the appropriate seller database(s) 32 and/or repository 34 requesting that databases 32 and/or repository 34 each return a listing of all products (including associated product data and/or seller data) that meet the search criteria. Databases 32 and/or repository 34 may also return data relating to attribute values that were not included in the search criteria. For example, databases 32 may return a price and availability of products that meet the search criteria even if price and availability were not search criteria. The responses to the queries of databases 32 and/or repository 34 may be displayed to buyer 20 in any appropriate manner. For example, the products may be listed in order of relevance to the search criteria according to any suitable matching criteria. Furthermore, GCD 42 may reorder the product listing based on a request from buyer 20. For example, buyer 20 may request that the matching products be listed in order from least expensive to most expensive. Alternatively, the search results may be communicated directly to buyer 20 from databases 32 and/or repository 34.

Buyer 20 may select a product from the product listing to indicate a desire to initiate a transaction regarding the product, such as a purchase of the product. On such a selection, GCD 42 may communicate a repository identifier (RID) identifying the selected seller 30 and a globally unique identifier (GUID) for the product to buyer 20. For example, an RID may be the network address (such as an IP address) of a seller network node 30 or may be associated with the network address in a table (in which case GCD 42 may use the RID to look up the associated network address and then communicate the network address to buyer 20). Buyer may access the seller 30 using the RID (or network address) and request a transaction regarding the product using the GUID. GCD 42 may even provide a link including a URL of a web site associated with the seller 30 or may provide another appropriate method for buyer 20 to be connected to seller 20. Although only a single example arrow (between buyer 20n and seller 30n) is shown to illustrate communication between buyers 20 and sellers 30, it should be understood that any buyer 20 may communicate with any seller 30 to conduct appropriate transactions.

Although the present invention has been described with several embodiments, divers changes, substitutions, variations, alterations, and modifications may be suggested to one skilled in the art, and it is intended that the invention encompass all such changes, substitutions, variations, alterations, and modifications falling within the spirit and scope of the appended claims.

What is claimed is:

1. An electronic commerce system, comprising:
a global content directory server coupled with one or more seller databases over a network, the global content directory server providing a plurality of buyer computers access to the one or more seller databases, the global content directory server comprising:
a storage medium stored therein a schema translation tool comprising:
a storage medium stored therein a mapping module configured to:
receive source schema data and target schema data, the source schema data and the target schema data each comprising a taxonomy comprising a hierarchy of classes into which products are categorized, wherein the target schema data comprises a different taxonomy then the taxonomy of the source schema data, at least the source schema data further comprising a product ontology associated with one or more of the classes, each product ontology comprising one or more product attributes, at least the source schema data further comprising one or more pointers identifying one or more seller databases and associated with at least one source class, the one or more seller databases including product data associated with one or more products categorized in the source class;
generate a graphical representation of the taxonomies of the source schema data and the target schema data, the graphical representation allowing at least one of the plurality of buyer computers to graphically associate classes of the source schema data with classes of the target schema data;
communicate the graphical representation to at least one of the plurality of buyer computers; and
associate one or more source classes of the source schema data with one or more target classes of the target schema data; and
a storage medium stored therein an ontology generation module configured to generate a product ontology for each of the target classes, wherein at least one of the target classes is a parent class and the product ontology for each target class is based on the product ontologies of the associated source classes by determining an intersection of the product attributes included in the product ontologies of the target classes.

2. The system of claim 1, wherein the mapping module is further configured to:
receive input from at least one of the plurality of buyer computers indicating one or more source classes to be associated with one or more target classes; and
associate the source classes with the target classes in response to the input from a user associated with at least one of the plurality of buyer computers.

3. The system of claim 1, wherein the source classes are leaf classes of the source schema data.

4. The system of claim 1, wherein the ontology generation module is further configured to generate a product ontology for a target class by determining the intersection of the product attributes included in the product ontologies of the associated source classes.

5. The system of claim 1, wherein:
at least the source schema data further comprises a seller ontology associated with one or more of the classes, each seller ontology comprising one or more attributes associated with one or more sellers of a product; and the ontology generation module is further configured to generate a seller ontology for each of the target classes based on the seller ontologies of the associated source classes.

6. The system of claim 1, wherein:
the mapping module is further configured to associate the one or more pointers of the source class with one or more target classes associated with the source class.

7. A computer-implemented method of translating schema data, comprising:
receiving, by a computer, source schema data and target schema data, the source schema data and the target schema data each comprising a taxonomy comprising a hierarchy of classes into which products may be categorized, wherein the target schema data comprises a different taxonomy then the taxonomy of the source schema data, at least the source schema data further comprising a product ontology associated with one or more of the classes, each product ontology comprising one or more product attributes, at least the source schema data further comprising one or more pointers identifying one or more seller databases and associated with at least one source class, the one or more seller databases including product data associated with one or more products categorized in the source class;
generating, by the computer, a graphical representation of the taxonomies of the source schema data and the target schema data, the graphical representation allowing at least one of the plurality of buyer computers to graphically associate classes of the source schema data with classes of the target schema data;
communicating, by the computer, the graphical representation to at least one of the plurality of buyer computers;
associating, by the computer, one or more source classes of the source schema data with one or more target classes of the target schema data; and
generating, by the computer, a product ontology for each of the target classes wherein at least one of the target classes is a parent class and the product ontology for each target class is based on the product ontologies of the associated source classes by determining an intersection of the product attributes included in the product ontologies of the target classes.

8. The method of claim 7, further comprising:
receiving input from at least one of a plurality of buyer computers indicating one or more source classes to be associated with one or more target classes; and
associating the source classes with the target classes in response to the input from at least one of the plurality of buyer computers.

9. The method of claim 7, wherein the source classes are leaf classes of the source schema data.

10. The method of claim 7, further comprising generating a product ontology for a target class by determining the intersection of the product attributes included in the product ontologies of the associated source classes.

11. The method of claim 7, wherein:
at least the source schema data further comprises a seller ontology associated with one or more of the classes, each seller ontology comprising one or more attributes associated with one or more sellers of a product; and
the method further comprises generating a seller ontology for each of the target classes based on the seller ontologies of the associated source classes.

12. The method of claim 7, wherein:
the method further comprises associating the pointers of the source class with one or more target classes associated with the source class.

13. A non-transitory computer-readable medium embodied with software for translating between schemas, the software when executed using one or more computers is configured to:
receive source schema data and target schema data, the source schema data and the target schemas each comprising a taxonomy comprising a hierarchy of classes into which products may be categorized, wherein the target schema data comprises a different taxonomy then the taxonomy of the source schema data, at least the source schema data further comprising a product ontology associated with one or more of the classes, each product ontology comprising one or more product attributes, at least the source schema data further comprising one or more pointers identifying one or more seller databases and associated with at least one source class, the one or more seller databases including product data associated with one or more products categorized in the source class;
generate a graphical representation of the taxonomies of the source schema data and the target schema data, the graphical representation allowing at least one of the plurality of buyer computers to graphically associate classes of the source schema data with classes of the target schema data;
communicate the graphical representation to at least one of the plurality of buyer computers;
associate one or more source classes of the source schema data with one or more target classes of the target schema data; and
generate a product ontology for each of the target classes wherein at least one of the target classes is a parent class and the product ontology for each target class is based on the product ontologies of the associated source classes by determining an intersection of the product attributes included in the product ontologies of the target classes.

14. The computer-readable medium of claim 13, wherein the software is further configured to:
receive input from at least one of a plurality of buyer computers indicating one or more source classes to be associated with one or more target classes; and
associate the source classes with the target classes in response to the input from at least one of the plurality of buyer computers.

15. The computer-readable medium of claim 13, wherein the source classes are leaf classes of the source schema data.

16. The computer-readable medium of claim 13, wherein the software is further configured to generate a product ontology for a target class by determining the intersection of the product attributes included in the product ontologies of the associated source classes.

17. The computer-readable medium of claim 13, wherein:
at least the source schema data further comprises a seller ontology associated with one or more of the classes, each seller ontology comprising one or more attributes associated with one or more sellers of a product; and
the software is further configured to generate a seller ontology for each of the target classes based on the seller ontologies of the associated source classes.

18. The computer-readable medium of claim 13, wherein:
the software is further configured to associate the pointers of the source class with one or more target classes associated with the source class.

19. A electronic commerce system, comprising:

a global content directory server coupled with one or more seller databases over a network, the global content directory server providing a plurality of buyer computers access to the one or more seller databases, the global content directory server comprising:

a storage medium stored therein a schema translation tool comprising:

a storage medium stored therein a mapping module configured to:

receive source schema data and target schema data, the source schema data and the target schema data each comprising a taxonomy comprising a hierarchy of classes into which products may be categorized, wherein the target schema data comprises a different taxonomy then the taxonomy of the source schema data, at least the source schema data further comprising a product ontology associated with one or more of the classes, each product ontology comprising one or more product attributes, at least the source schema data further comprising one or more pointers identifying one or more seller databases and associated with at least one source class, the one or more seller databases including product data associated with one or more products categorized in the source class;

generate a graphical representation of the taxonomies of the source schema data and target schema data, the graphical representation allowing at least one of a plurality of buyer computers to graphically associate the classes of the source schema data with classes of the target schema data;

communicate the graphical representation to at least one of the plurality of buyer computers and receive input from at least one of the plurality of buyer computers indicating one or more source classes of the source schema data to be associated with one or more target classes of the target schema data;

associate one or more source classes with one or more target classes in response to the input from at least one of the plurality of buyer computers; and associate the pointers of the source classes with one or more target classes associated with the source class; and a storage medium stored therein an ontology generation module configured to generate a product ontology for each of the target classes based on the intersection of the product attributes included in the product ontologies of the associated source classes.

20. A method for translating between schemas, comprising:

receiving, by a computer, source schema data and target schema data, the source schema data and the target schema data each comprising a taxonomy comprising a hierarchy of classes into which products may be categorized, at least the source schema data further comprising a product ontology associated with one or more of the classes, each product ontology comprising one or more product attributes, at least the source schema data further comprising one or more pointers identifying one or more seller databases and associated with at least one source class, the one or more seller databases including product data associated with one or more products categorized in the source class;

generating, by the computer, a graphical representation of the taxonomies of the source schema data and the target schema data, the graphical representation allowing at least one of a plurality of buyer computers to graphically associate the classes of the source schema data with classes of the target schema data;

communicating, by the computer, the graphical representation to at least one of the plurality of buyer computers and receiving, by the computer, input from at least one of the plurality of buyer computers indicating one or more source classes of the source schema data to be associated with one or more target classes of the target schema data;

associating, by the computer, one or more source classes with one or more target classes in response to the input from at least one of the plurality of buyer computers;

associating, by the computer, the pointers of the source classes with one or more target classes associated with the source class; and generating, by the computer, a product ontology for each of the target classes based on the intersection of the product attributes included in the product ontologies of the associated source classes.

21. A non-transitory computer-readable medium embodied with software for translating between schemas, the software when executed using one or more computers is configured to:

receive source schema data and target schema data, the source schema data and the target schema data each comprising a taxonomy comprising a hierarchy of classes into which products may be categorized, at least the source schema data further comprising a product ontology associated with one or more of the classes, each product ontology comprising one or more product attributes, at least the source schema data further comprising one or more pointers identifying one or more seller databases and associated with at least one source class, the one or more seller databases including product data associated with one or more products categorized in the source class;

generate a graphical representation of the taxonomies of the source schema data and the target schema data, the graphical representation allowing at least one of a plurality of buyer computers to graphically associate the classes of the source schema data with classes of the target schema data;

communicate the graphical representation to at least one of the plurality of buyer computers and receive input from at least one of the plurality of buyer computers indicating one or more source classes of the source schema data to be associated with one or more target classes of the target schema data;

associate one or more source classes with one or more target classes in response to the input from at least one of the plurality of buyer computers;

associate the pointers of the source classes with one or more target classes associated with the source class; and generate a product ontology for each of the target classes based on the intersection of the product attributes included in the product ontologies of the associated source classes.

\* \* \* \* \*